United States Patent [19]

Uemura et al.

[11] Patent Number: 5,369,144
[45] Date of Patent: Nov. 29, 1994

[54] ADHESIVE COMPOSITION FOR ADHERING ARTIFICIAL NAIL

[75] Inventors: Hiroshi Uemura, Muko; Ethuo Yosida, Kameoka; Shin Iwaki, Yawata, all of Japan

[73] Assignee: Ohara Paragium Chemical Co., Ltd., Kyoto, Japan

[21] Appl. No.: 173,066

[22] Filed: Dec. 27, 1993

[30] Foreign Application Priority Data

Sep. 1, 1993 [JP] Japan .................................. 5-242040

[51] Int. Cl.$^5$ ...................... C08L 27/00; C08L 31/00; C08F 259/00
[52] U.S. Cl. .................................. 525/11.8; 524/520; 524/533; 524/544; 525/276; 526/245
[58] Field of Search ................ 523/118; 524/520, 533, 524/544; 525/276; 526/245

[56] References Cited

U.S. PATENT DOCUMENTS 4,105,715  8/1978  Gleave ................................. 525/276

Primary Examiner—Paul R. Michl
Assistant Examiner—LaVonda R. DeWitt
Attorney, Agent, or Firm—Nikaido, Marmelstein, Murray & Oram

[57] ABSTRACT

An adhesive composition for adhering an artificial nail to the nail comprising 2-methoxyisopropyl α-cyanoacrylate, and a copolymer of a specified alkyl acrylate or alkyl methacrylate and a specified fluorinated alkyl acrylate or fluorinated alkyl methacrylate. The composition is very low in exothermic temperature and has satisfactory properties to permit the artificial nail to be peeled off easily within a short period of time.

4 Claims, No Drawings

ADHESIVE COMPOSITION FOR ADHERING ARTIFICIAL NAIL

BACKGROUND OF THE INVENTION

1. Field of the Invention

The present invention relates to an adhesive composition for adhering an artificial nail to the nail.

2. Description of the Prior Art

Alpha-cyanoacrylate adhesive agents are well known as so-called instantaneous adhesives and have found wide use in various fields. For example, such agents are used for adhering artificial nails to nails.

While the nail originally serves to protect the fingertip, the fingertip is a portion which attracts attention, so that recently there is a tendency to apply a cosmetic also to the nail for beautification. Furthermore, there is a growing tendency not only to make up the nail itself but also to adhere a beautiful artificial nail to the nail for beautification and protection of the nail.

Accordingly adhesive agents are already developed for adhering artificial nails to nails, and α-cyanoacrylate adhesive agents, especially methyl α-cyanoacrylate and ethyl α-cyanoacrylate, are in use.

The characteristics required of the adhesive agent for adhering artificial nails are as follows.

(a) Since the nail itself, which is part of the human body, has a temperature approximate to the body temperature at all times, the α-cyanoacrylate adhesive agent rapidly undergoes polymerization to release heat, which is likely to cause damage to the nail or the finger. It is therefore required that the agent be least likely to produce heat or do not cause such a rise in temperature as to damage the nail or finger even if releasing heat.

(b) The agent should permit the artificial nail to be separated off easily within a short period of time.

However, the methyl or ethyl α-cyanoacrylate adhesive agents mentioned above fail to fulfill these two requirements, so that α-cyanoacrylate adhesive agents represented by the formula (1)

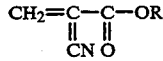

wherein R is methoxyethyl, ethoxyethyl or tetrahydrofurfuryl have been developed recently as disclosed also in Unexamined Japanese Patent Publication SHO 58-103406.

Although improved to some extent in respect of the above two requirements, these agents have yet to be fully improved, need to be further prevented from releasing heat and require a considerable period of time for the separation of artificial nails.

SUMMARY OF THE INVENTION

Accordingly, the main object of the present invention is to provide an α-cyanoacrylate adhesive composition which is greatly reduced in exothermic temperature and which has satisfactory properties to permit artificial nails to be peeled off easily within a short period time, and a method of adhering artificial nails.

The above object is fulfilled by using as an agent for adhering artificial nails to nails an adhesive composition comprising 2-methoxyisopropyl α-cyanoacrylate, and a copolymer of an alkyl acrylate or alkyl methacrylate represented by the formula (2)

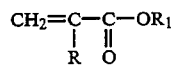

wherein R is H or $CH_3$, and $R_1$ is alkyl having 1 to 18 carbon atoms and a fluorinated alkyl acrylate or fluorinated alkyl methacrylate represented by the formula (3)

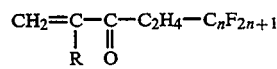

wherein R is H or $CH_3$, and n is an integer of from 4 to 8.

DETAILED DESCRIPTION OF THE INVENTION

According to the present invention, the specified cyanoacrylate, i.e., the above-mentioned 2-methoxyisopropyl α-cyanoacrylate, is used as the main component in combination with the above-specified copolymer. As will be apparent from some of the examples given later, this composition has the remarkable advantage of being very low in exothermic temperature and permitting artificial nails to be peeled off from nails easily.

With the present invention, the proportions of 2-methoxyisopropyl α-cyanoacrylate and the copolymer are 99.8 to 85 wt. %, preferably 99.0 to 85.0 wt. %, of the acrylate and 0.2 to 15 wt. %, preferably 1.0 to 15.0 wt. %, of the copolymer. If the proportion of the copolymer is less than 0.2 wt. %, the composition fails to have a sufficiently reduced exothermic temperature, whereas if the proportion is in excess of 15 wt. %, the composition tends to exhibit a lower bond strength.

2-Methoxyisopropyl α-cyanoacrylate for use in the present invention is a known compound. It is required that the cyanoacrylate be a methoxyisopropyl compound. The advantage contemplated by the present invention is not expectable if it is, for example, a methoxyethyl or methoxymethyl compound. The composition then fails to exhibit a sufficiently lowered exothermic temperature and to permit smooth separation of the artificial nail from the nail.

The copolymer to be used in the present invention comprises an alkyl acrylate or alkyl methacrylate represented by the formula (2), and a fluorinated alkyl acrylate or fluorinated alkyl methacrylate represented by the formula (3). The proportions of these monomers to be copolymerized are 99.8 to 94.3 wt. %, preferably 99.0 to 94.3 wt. %, of the former (the acrylate of the formula (2)), and the balance the acrylate or methacrylate of the formula (3).

The group $R_1$ in the acrylate or methacrylate represented by the formula (2) is alkyl having 9 to 18 carbon atoms. If the number of carbon atoms is greater than 18, the proportion of the (meth)acrylate to be copolymerized with the fluorinated alkyl (meth)acrylate reduces greatly, so that larger numbers are not desirable. Further n in the acrylate or methacrylate of the formula (3) is an integer of from 4 to 8. When the number n is less than 4, the artificial nail will not be peeled off smoothly, whereas if the number exceeds 8, the solubility of the copolymer in the α-cyanoacrylate markedly lowers.

The process for preparing the copolymer is not limited in any way; any process is usable insofar as the two monomers can be polymerized. Preferably, the copolymer can be prepared, for example, by reacting the comonomers at an elevated temperature of at least 40° C. in an organic solvent which dissolves the monomers and the copolymer, such as benzene or toluene, in the presence of a radical polymerization initiator, placing the reaction mixture into a precipitating agent to separate out a product, and filtering off and drying the product. When required, the product is purified by reprecipitation.

Preferably, the adhesive composition of the present invention has incorporated therein 20 to 200 ppm of spiculisporic acid serving as a stabilizer. The acid gives greatly improved stability to the composition. When required, various additives which have heretofore been used for such α-cyanoacrylate adhesive compositions are added to the composition of the invention. Examples of usual additives are anionic polymerization inhibitors such as $SO_2$, $BF_3$, methanesulfonic acid, p-toluenesulfonic acid and like acidic substances, and radical polymerization inhibitors such as hydroquinone, pyrogallol, hydroquinone monomethyl ether and the like.

The adhesive composition of the invention is used for adhering artificial nails to nails by applying the composition in the same manner as is conventional in the art.

Experimental Example 1

Copolymers were prepared from monomer mixtures each comprising 99.8 to 93.0 wt. % of one of various acrylic or methacrylic acid esters and 0.2 to 7.0 wt. % of a fluorinated alkyl ester of acrylic or methacrylic acid by reacting the monomer mixture in a solvent such as benzene, toluene, trichloroethylene or the like (in two to ten times the amount of the monomer mixture) in the presence of a radical polymerization initiator such as benzoyl peroxide or azobisisobutyronitrile (in an amount of 0.05 to 1.5 wt. % based on the monomer mixture) at 40° to 120° C. for 3 to 12 hours.

Each of the copolymers was poured into methanol (precipitating agent) in 15 to 20 times the amount of the solvent with vigorous stirring to obtain a finely divided precipitate. The copolymer thus treated was filtered off and then dried to a constant quantity in a vacuum with heating within a dryer (adjusted to 40° C., at least 5 mm Hg) to obtain a powdery copolymer.

The reaction time and temperature, the amount of catalyst, the amount of solvent, etc. were so adjusted that the copolymer thus obtained exhibited a viscosity of 5 to 30 cps, preferably 10 to 20 cps, at 20° C. when dissolved in acetone to a concentration of 5 wt. %.

Experimental Example 2

A series of copolymers were prepared from combinations of 5 wt. % of perfluorooctylethyl methacrylate (hereinafter referred to as "FM monomer") and 95 wt. % of various acrylates or methacrylates listed in Table 1. The copolymers were admixed in an amount of 5.0 wt. % with 2-methoxyisopropyl α-cyanoacrylate (containing 4 to 5 ppm of methanesulfonic acid, 4 to 5 ppm of spiculisporic acid and 100 ppm of hydroquinone) and tested for solubility. Table 1 shows the results.

TABLE 1

| Copolymer<br>Acrylate (or methacrylate)<br>(95.0 wt. %) copolymerized<br>with FM monomer (5.0 wt. %) | Adhesive composition<br>Properties of copolymer<br>(5.0 wt. %) as added to<br>2-methoxyisopropyl<br>α-cyanoacrylate |
|---|---|
| Methyl MA | ⊙ Homogeneously dissolved, good stability |
| Ethyl MA | ⊙ Homogeneously dissolved, good stability |
| Ethyl A | ⊙ Homogeneously dissolved, good stability |
| Butyl A | ⊙ Homogeneously dissolved, good stability |
| Isobutyl MA | ⊙ Homogeneously dissolved, good stability |
| Butyl MA | ⊙ Homogeneously dissolved, good stability |
| Lauryl MA | ○ Dissolved, became slightly turbid in white with time |
| Phenoxytetraethylene glycol A | Δ Became turbid in white |
| 2-Hydroxy-3-phenoxypropyl A | X Insoluble |
| Polyethylene glycol mono-MA | X Insoluble |
| 2-Hydroxyethyl MA | X Insoluble |
| Glycidyl MA | X Insoluble |
| Tetrahydrofurfuryl MA | X Insoluble |
| Methoxypolyethylene glycol MA | X Insoluble |
| Methoxyethyl A | Δ–X Became turbid in white, became insoluble with time |
| Ethoxyethylene glycol A | X Insoluble |
| Ethylene glycol di-MA | X Insoluble |

In Table 1, the symbol A stands for acrylate, and the symbol MA for methacrylate.

Table 1 reveals that the copolymers comprising a $C_1$–$C_4$ alkyl acrylate (or methacrylate) and FM monomer were homogeneously soluble in 2-methoxyisopropyl α-cyanoacrylate, giving adhesive compositions having good stability.

On the other hand, the copolymers comprising a hydrophilic or mono-or multi-functional acrylic or methacrylic monomer containing hydroxyl, epoxy or the like, and FM monomer were insoluble in 2-methoxyisopropyl α-cyanoacrylate and unsuitable for use as copolymers in the present invention.

Experimental Example 3

Copolymers were prepared in the same manner as in Experimental Example 2 with the exception of using perfluorooctylethyl acrylate (FA monomer) in place of FM monomer. When the copolymers were similarly teated, the same results as in Table 1 were achieved.

Experimental Example 4

In place of FM monomer or FA monomer, other fluorinated alkyl methacrylate, such as 2,2,3,4,4,4-hexafluorobutyl methacrylate or 2,2,3,3-tetrafluoropropyl methacrylate, was reacted with various acrylates (or methacrylates) in varing polymerization ratios to obtain copolymers, which were then teated. Some of these copolymers were insoluble in 2-methoxyisopropyl α-cyanoacrylate, while the others were soluble but separated out as insolubles with the lapse of time.

EXAMPLES

The present invention will be described in greater detail with reference to the following examples.

Example 1

Various copolymers were prepared from two kinds of monomer units, i.e., 99.8 to 93.0 wt. % of methyl methacrylate (MMA) and 0.2 to 7.0 wt. % of perfluorooctylethyl methacrylate (FM monomer). These copolymers were dissolved in an amount of 5.0 wt. % in 2-methoxyisopropyl α-cyanoacrylate (containing 15 to 20 ppm of $BF_3$ as an anionic polymerization inhibitor and 120 ppm of hydroquinone as an anionic polymerization inhibitor) to produce a series of adhesive compositions. These adhesive compositions were tested for exothermic temperature during polymerization. Table 2 shows the results.

TABLE 2

| | Copolymer Monomer unit | | Properties of adhesive composition 95 wt. % α-cyanoacrylate + 5 wt. % copolymer | |
|---|---|---|---|---|
| No. | MMA monomer (wt. %) | FM monomer (wt. %) | Appearance | Exothermic temp. (°C.) |
| 1 | — | — | No copolymer | 44.3 |
| 2 | 100.0 | 0 | Transparent liquid | 41.2 |
| 3 | 99.8 | 0.2 | Transparent liquid | 39.0 |
| 4 | 99.5 | 0.5 | Transparent liquid | 37.3 |
| 5 | 99.0 | 1.0 | Transparent liquid | 34.2 |
| 6 | 98.0 | 2.0 | Transparent liquid | 33.0 |
| 7 | 97.0 | 3.0 | Transparent liquid | 32.3 |
| 8 | 95.0 | 5.0 | Transparent liquid | 31.2 |
| 9 | 94.5 | 5.5 | Transparent liquid | 31.0 |
| 10 | 94.3 | 5.7 | Transparent liquid | 31.0 |
| 11 | 94.0 | 6.0 | Slight white turbidity | 32.0 |
| 12 | 93.0 | 7.0 | Separation of insolubles | 40.6 |

The polymerization exothermic temperature was determined by the following method.

A plain weave silk fabric, 30 mm square, was wound as folded in two around the temperature sensor portion of a thermometer, fastened thereto with a thread and allowed to stand in a constant-temperature constant-humidity chamber at 27±1° C. and 60±2% RH for 20 minutes. Two drops of the sample of α-cyanoacrylate adhesive composition were thereafter applied to the fabric around the temperature sensor portion for polymerization. The maximum temperature due to the resulting rise in temperature was read. This procedure was repeated five times, and the average value was recorded.

Example 2

A series of α-cyanoacrylate adhesive compositions for nails were prepared by dissolving 0.2 to 20 wt. % of the copolymer No. 8 of Table 2 in the same 2-methoxyisopropyl α-cyanoacrylate as used in Example 1. The compositions were teated for polymerization exothermic temperature and setting time. Table 3 shows the results.

For comparison, the copolymer for use in the invention was added to various α-cyanoacrylates generally used for nails. The resulting compositions were similarly tested with the results shown also in Table 3.

TABLE 3

| Components of adhesive composition | | | Properties of adhesive composition | | |
|---|---|---|---|---|---|
| α-Cyanoacrylate (wt. %) | | Copolymer (Table 2, No. 8) (wt. %) | Appearance | Exothermic temp. (°C.) | Setting time (sec) |
| Invention | | | | | |
| 2-Methoxyisopropyl | 100.0 | 0 | Transparent liquid | 43.3 | 15 |
| 2-Methoxyisopropyl | 99.8 | 0.2 | Transparent liquid | 38.6 | 15 |
| 2-Methoxyisopropyl | 99.5 | 0.5 | Transparent liquid | 38.5 | 15 |
| 2-Methoxyisopropyl | 99.0 | 1.0 | Transparent liquid | 35.0 | 20 |
| 2-Methoxyisopropyl | 97.0 | 3.0 | Transparent liquid | 33.7 | 25 |
| 2-Methoxyisopropyl | 95.0 | 5.0 | Transparent liquid | 31.2 | 25 |
| 2-Methoxyisopropyl | 93.0 | 7.0 | Transparent liquid | 31.0 | 25 |
| 2-Methoxyisopropyl | 90.0 | 10.0 | Transparent liquid | 31.2 | 30 |
| 2-Methoxyisopropyl | 85.0 | 15.0 | Transparent liquid | 31.0 | 35 |
| 2-Methoxyisopropyl | 83.0 | 17.0 | White turbidity, some insolubles | 31.5 | 40 |
| 2-Methoxyisopropyl | 80.0 | 20.0 | White turbidity, separation of insolubles | 33.2 | 65 |
| Comp. Ex. | | | | | |
| Methyl | 95.0 | 5.0 | Transparent liquid | 62.3 | 10 |
| Ethyl | 95.0 | 5.0 | Transparent liquid | 56.5 | 10 |
| Isobutyl | 95.0 | 5.0 | Transparent liquid | 52.0 | 15 |
| 2-Methoxyethyl | 95.0 | 5.0 | Slight turbidity | 41.1 | 40 |
| 2-Ethoxyethyl | 95.0 | 5.0 | Transparent liquid | 42.6 | 35 |
| Tetrahydrofurfuryl | 95.0 | 5.0 | Transparent liquid | 38.7 | 35 |

Excellent adhesive compositions of the present invention for use with nails are obtainted by adding to 2-methoxyisopropyl α-cyanoacrylate an acrylate (or methacrylate) copolymer which comprises 99.5 to 94.0 wt. % of a $C_1$–$C_4$ alkyl acrylate (or methacrylate) and 0.5 to 6.0 wt. % of perfluorooctylethyl methacrylate (or acrylate) as monomer units.

The acrylate (or methacrylate) copolymers advantageously usable in the present invention are those comprising two kinds of monomer units, i.e., 99.5 to 94.0 wt. % (preferably 99.0 to 94.3 wt. %) of a $C_1$–$C_4$ alkyl acrylate (or methacrylate) and 0.5 to 6.0 wt. % (preferably 1.0 to 5.7 wt. %) of perfluorooctylethyl methacrylate (or acrylate).

Table 3 reveals that the α-cyanoacrylate adhesive compositions for nails which are lowest in polymerization exothermic temperature are those comprising 2-methoxyisopropyl α-cyanoacrylate and a copolymer added thereto and composed of a $C_1$–$C_4$ alkyl acrylate (or methacrylate) and perfluorooctylethyl methacrylate (or acrylate).

The proportion of the acrylic (or methacrylic) copolymer to be added to 2-methoxyisopropyl α-cyanoacrylate according to the invention is preferably 1.0 to 15 wt. % of the combined amount of the two components. If the proportion was less than 1 %, a corresponding effect was not available, whereas when it was not smaller than 17 %, it was impossible to obtain a homogeneous adhesive composition of good stability.

The setting time given in the table was measured by the following method.

Artificial nails (product of Cosmar of U.S.A) were adhered in pairs with the sample and thereafter peeled off successively with the lapse of time at an interval of 5 seconds to determine the time required for the pair of nails to become no longer separable.

Example 4

Each of the adhesive compositions listed in Table 4 was used for adhering a pair of artificial nails (the same as above) to each other, and the nails were immersed in a peeling agent (composition comprising 80 wt. % of acetonitrile, 16.7 wt. % of water, 3.0 wt. % of eucalyptus oil and 0.3 wt. % of hydroxyethyl cellulose) 24 hours thereafter to measure the time required for peeling. Table 4 shows the results.

These adhesives were further used by 16 females for adhering artificial nails to the nails, the users were then allowed to live a usual life for 5 days, and the artificial nails were thereafter checked for adhesion. Table 4 shows the results.

TABLE 4

| Components of adhesive composition | | Properties of adhesive composition | |
|---|---|---|---|
| α-Cyanoacrylate (wt. %) | | Copolymer (Table 2, No. 8) (wt. %) | Peeling time (min) | Adhesion of artificial nails to the nails (5 days after application) |
| Invention | | | | |
| 2-Methoxyisopropyl | 100.0 | 0 | 10~12 | Good |
| 2-Methoxyisopropyl | 99.8 | 0.2 | 7~8 | Good |
| 2-Methoxyisopropyl | 99.5 | 0.5 | 4~5 | Good |
| 2-Methoxyisopropyl | 97.0 | 3.0 | 2~3 | Good |
| 2-Methoxyisopropyl | 95.0 | 5.0 | 2~3 | Good |
| 2-Methoxyisopropyl | 90.0 | 10.0 | 2~3 | Good |
| 2-Methoxyisopropyl | 85.0 | 15.0 | 2~3 | Good |
| 2-Methoxyisopropyl | 83.0 | 17.0 | 3~4 | Some peeled |
| 2-Methoxyisopropyl | 80.0 | 20.0 | 5~6 | Some peeled |
| Comp. Ex. | | | | |
| Methyl | 100.0 | 0 | 65~67 | Good |
| Methyl | 95.0 | 5.0 | 53~55 | Good |
| Ethyl | 100.0 | 0 | 40~42 | Good |
| Ethyl | 95.0 | 5.0 | 39~40 | Good |
| 2-Methoxyethyl | 100.0 | 0 | 6~7 | Good |
| 2-Ethoxyethyl | 95.0 | 5.0 | 6~7 | Good |
| 2-Ethoxyethyl | 100.0 | 0 | 6~7 | Good |
| 2-Ethoxyethyl | 95.0 | 5.0 | 6~7 | Good |
| Tetrahydrofurfuryl | 100.0 | 0 | 8~9 | Good |
| Tetrahydrofurfuryl | 95.0 | 5.0 | 6~7 | Good |

The results of Table 4 indicate that the artificial nail can be adhered to the nail with the α-cyanoacrylate adhesive compositions of the invention for nails with such a strength that the artificial nail will not peel off during the usual life. With the adhesive composition of the invention containing at least 17 wt. % of the copolymer, some of the artificial nails peeled off in 4 females.

When to be peeled off, the artificial nail was removable with the releasing agent in substantially the same period of time as the peeling time listed in the table without leaving any trace of damage to the nail stripped of the artificial one.

The comparative compositions exhibited satisfactory properties to adhere the artificial nail but required a longer period of time for peeling than the compositions of the invention.

What is claimed is:

1. An adhesive composition for adhering an artificial nail to the nail with use of an adhesive composition consisting primarily 2-methoxyisopropyl α-cyanoacrylate, and a copolymer of an alkyl acrylate or alkyl methacrylate represented by the formula (2)

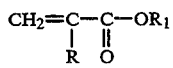

wherein R is H or CH$_3$, and R$_1$, is alkyl having 1 to 18 carbon atoms and a fluorinated alkyl acrylate or fluorinated alkyl methacrylate represented by the formula (3)

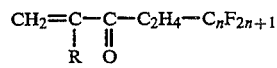

wherein R is H or CH$_3$, and n is an integer of from 4 to 8.

2. An adhesive composition as defined in claim 1 wherein the copolymer is a copolymer comprising 99.8 to 94.3 wt. % of the acrylate or methacrylate of the formula (2) and 0.2 to 5.7 wt. % of the acrylate or methacrylate of the formula (3).

3. An adhesive composition as defined in claim 1 or 2 which comprises 99.8 to 85 wt. % of 2-methoxyisopropyl α-cyanoacrylate and 0.2 to 15 wt. % of the copolymer.

4. An adhesive composition as defined in any one claims 1 to 3 which further comprises spiculisporic acid as a stabilizer.

* * * * *